D. H. BENJAMIN.
MOLDING AND IRONING MACHINE.
APPLICATION FILED FEB. 8, 1911.

1,220,590.

Patented Mar. 27, 1917.
6 SHEETS—SHEET 1.

Witnesses:
A. L. Lord.
C. N. French.

Inventor.
Dana H. Benjamin
by B. W. Brockett.
Attorney.

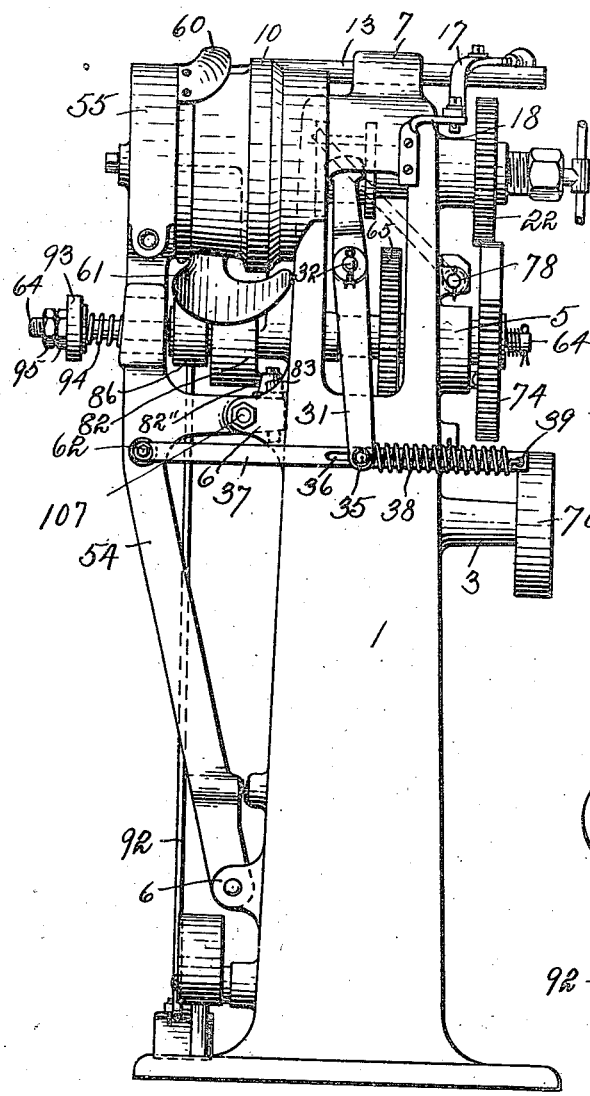
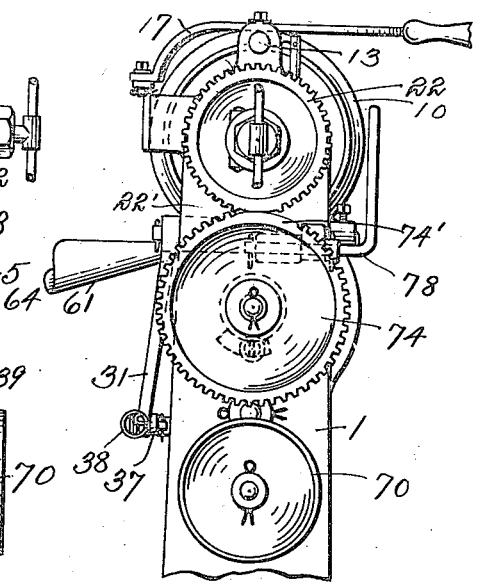
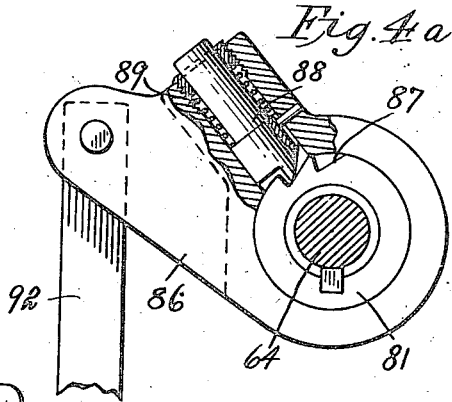
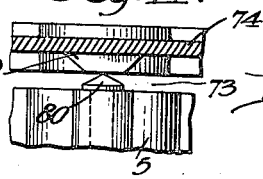

D. H. BENJAMIN.
MOLDING AND IRONING MACHINE.
APPLICATION FILED FEB. 8, 1911.

1,220,590.

Patented Mar. 27, 1917.
6 SHEETS—SHEET 4.

D. H. BENJAMIN.
MOLDING AND IRONING MACHINE.
APPLICATION FILED FEB. 8, 1911.
1,220,590.
Patented Mar. 27, 1917.
6 SHEETS—SHEET 5.
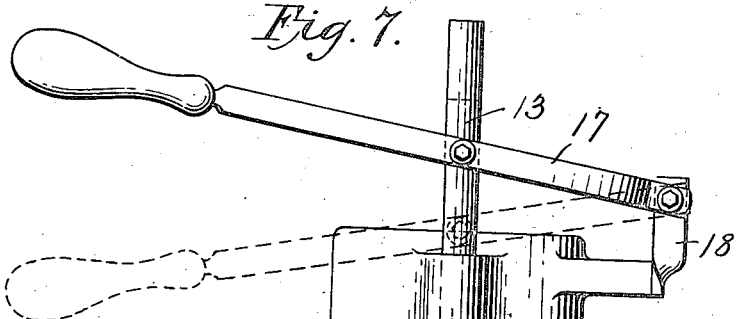
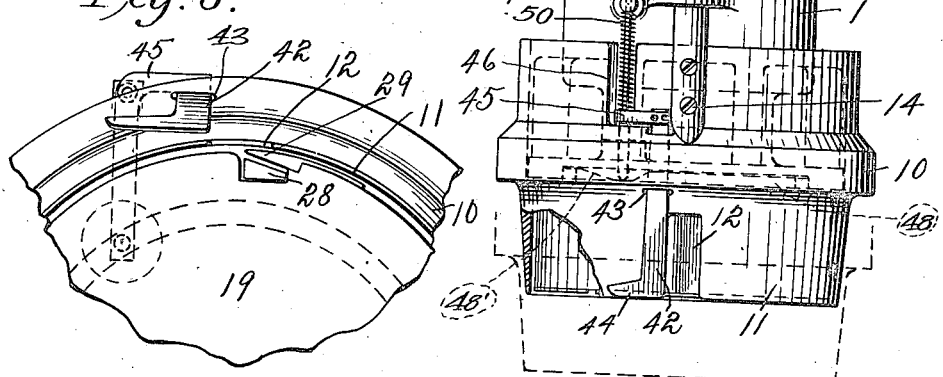
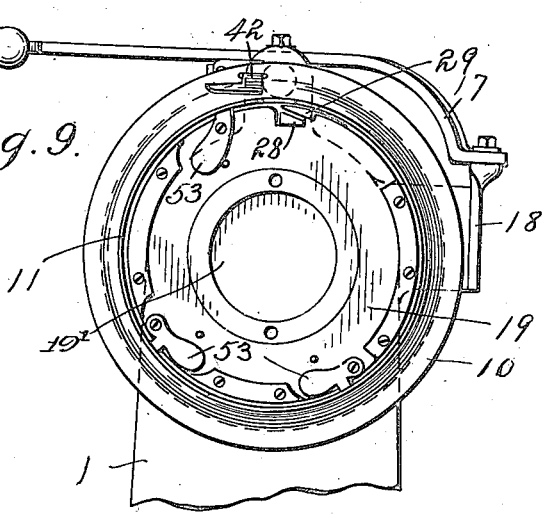
Witnesses:
A. L. Lord.
C. N. Tresch.
Inventor.
Dana H. Benjamin
by B. W. Brockett.
Attorney.

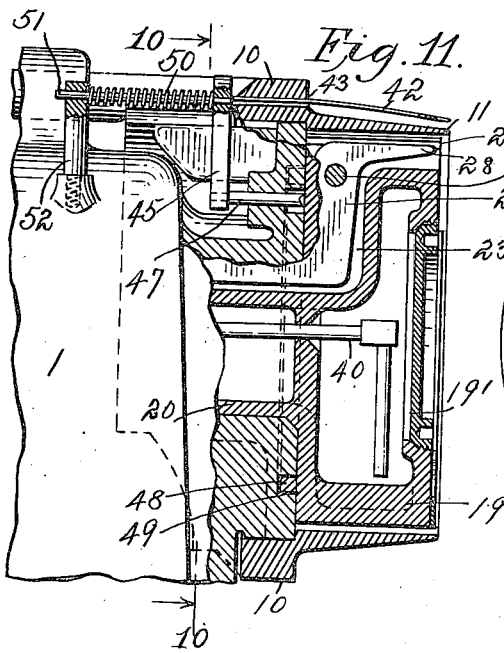
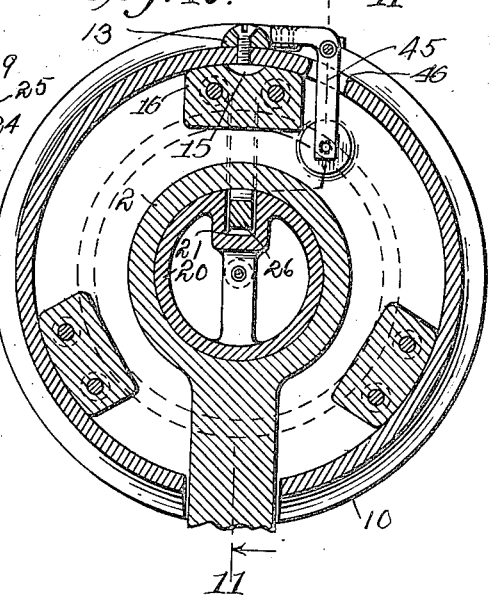
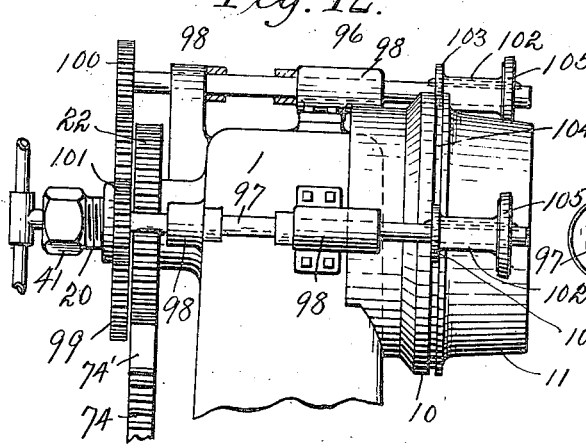
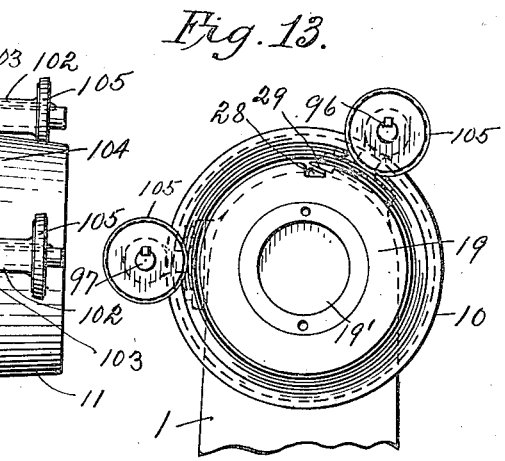

UNITED STATES PATENT OFFICE.

DANA H. BENJAMIN, OF CLEVELAND, OHIO, ASSIGNOR TO THE GUGGENHEIM LAUNDRY MACHINERY COMPANY, OF CLEVELAND, OHIO, A CORPORATION OF OHIO.

MOLDING AND IRONING MACHINE.

1,220,590.  Specification of Letters Patent.  Patented Mar. 27, 1917.

Application filed February 8, 1911. Serial No. 607,339.

*To all whom it may concern:*

Be it known that I, DANA H. BENJAMIN, a citizen of the United States, residing at Cleveland, in the county of Cuyahoga and State of Ohio, have invented certain new and useful Improvements in Molding and Ironing Machines, of which the following is a specification.

This invention relates to improvements in machines for finishing collars and is particularly adapted for molding or ironing the folded edges of turned-down collars, so that the collar will have tie-room and at the same time will be pressed in proper shape.

More specifically the invention consists in a former in the shape of an annulus adapted to receive the collar which is folded onto the former by suitable mechanism including a heated member which engages the folded edge and molds and irons the same into shape upon the former.

The invention further resides in certain details of construction hereinafter set forth in the following description, drawings and claims.

Figure 1:
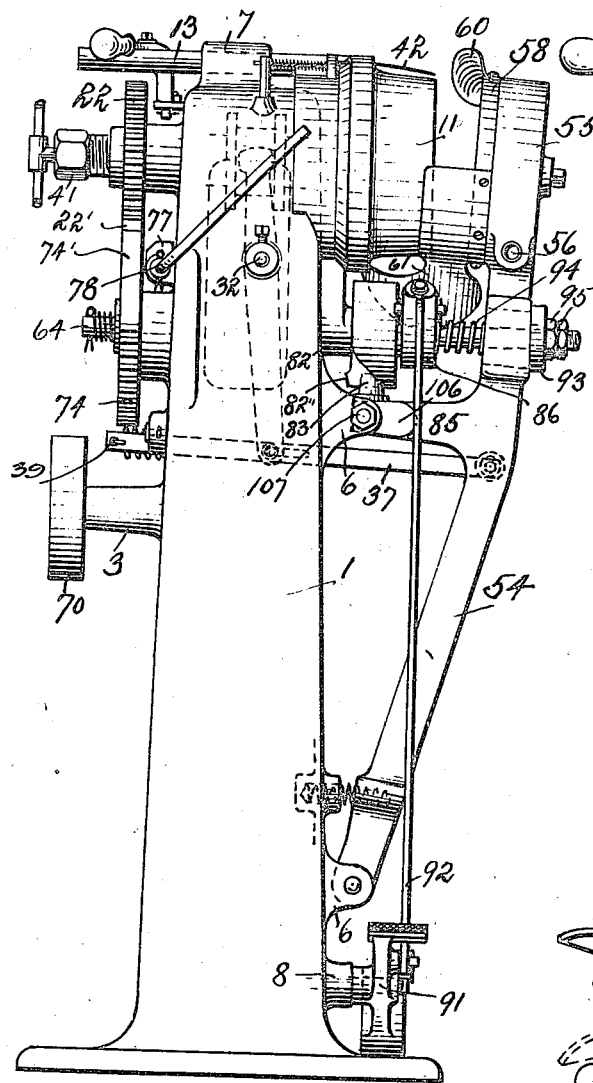
Figure 2:
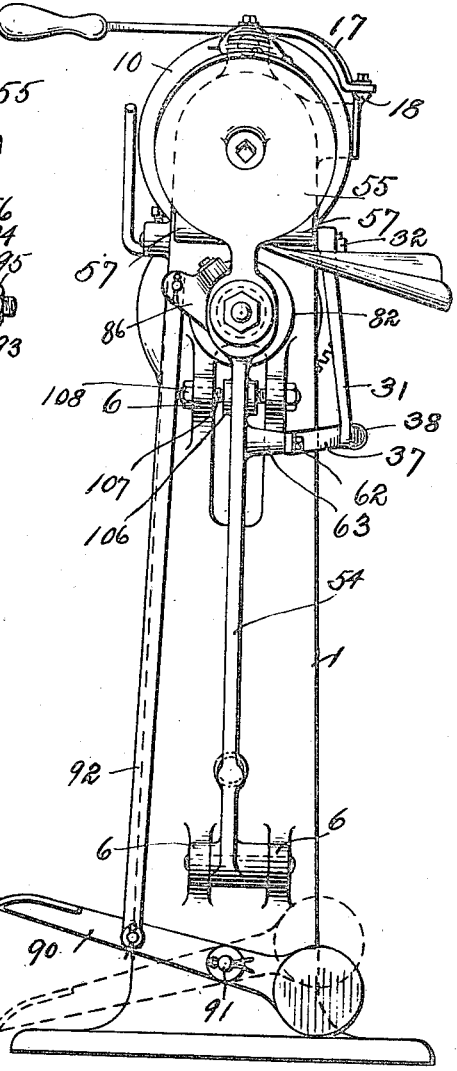
Figure 5:
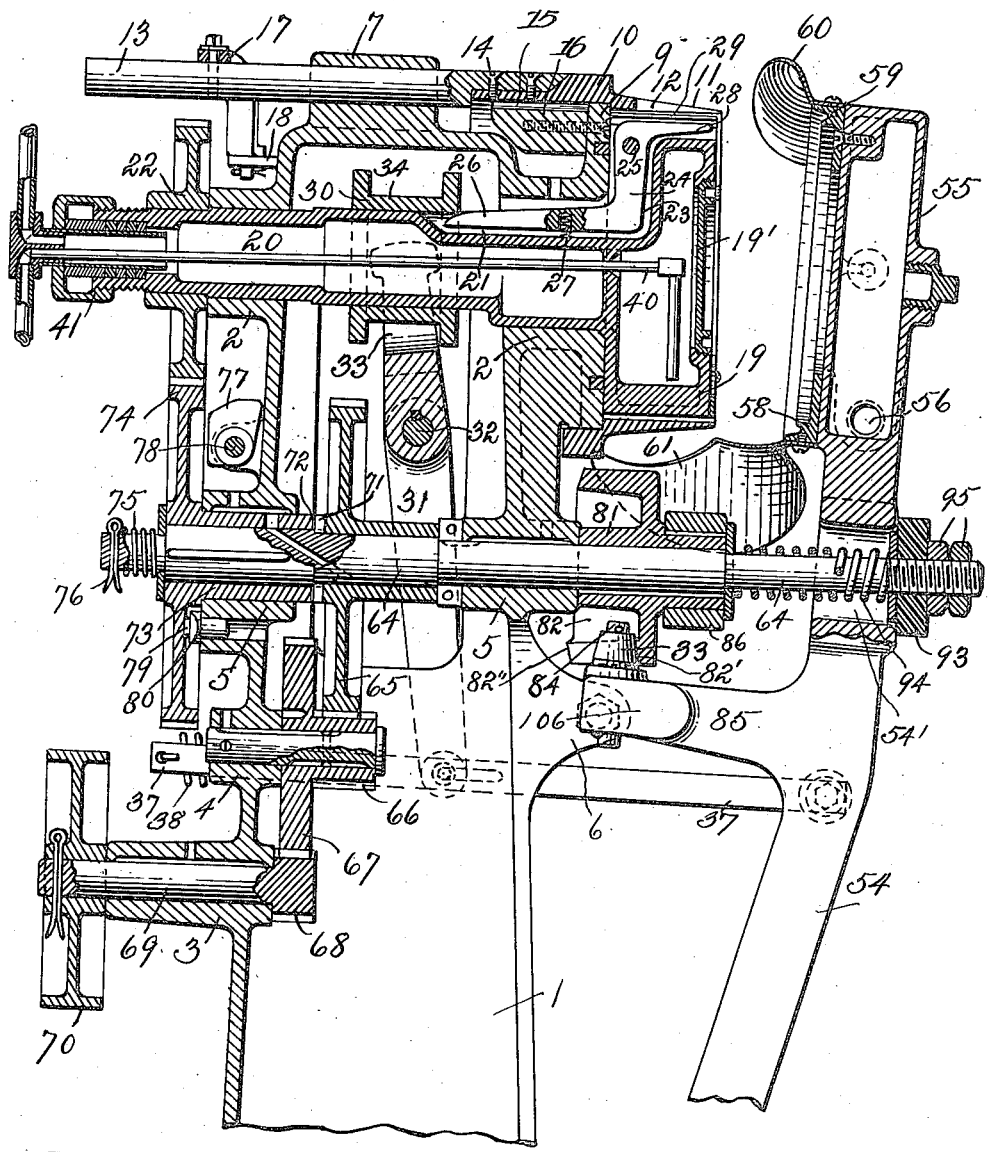
Figure 6:
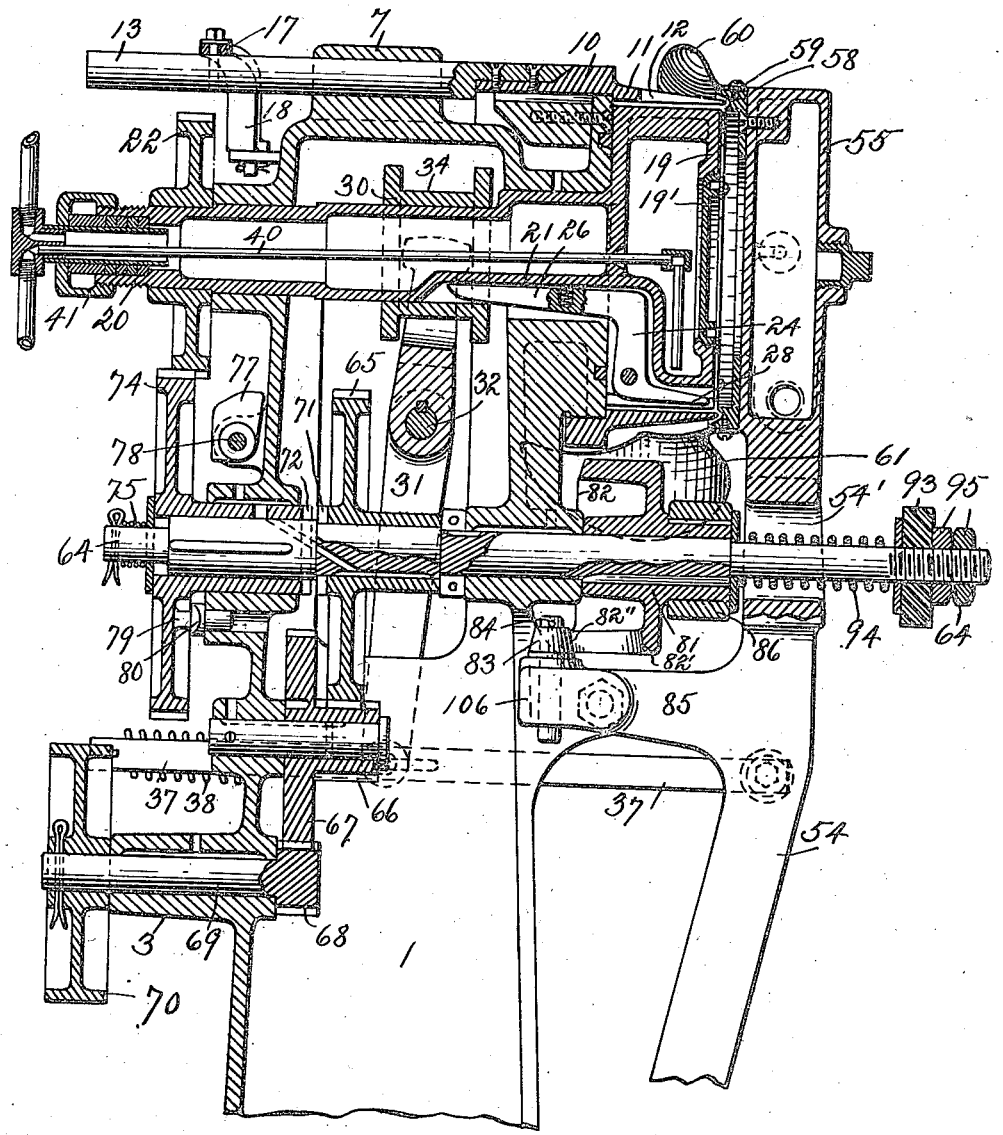

Referring to the drawings, Figure 1 is a side elevation of the machine; Fig. 2 is an end elevation looking to the left in Fig. 1;
Fig. 3 is a back side elevation; Fig. 4 is an end elevation looking to the left in Fig. 3; Fig. 5 is a sectional view of the upper part of the mechanism as viewed in Fig. 1 showing the parts in normal position when the machine is inactive; Fig. 6 is a similar view with the parts in-closed position; Fig. 7 is a top plan view of the upper part of the machine showing a guide used in starting the collar in the machine; Fig. 8 is a detail view of the clamp and the guide shown in top plan in Fig. 7; Fig. 9 is a front elevation of the forming head with its associated parts; Fig. 10 is a section across the forming head showing the inner arrangement of the parts and showing a portion of the guide operating mechanism; Fig. 11 is a section upon the line 11—11 of Fig. 10; Fig. 12 is a side elevation of an attachment for feeding and guiding the outside flap or top of the collar; Fig. 13 is an end elevation of this attachment; Fig. 14 is a detail view of the ratchet mechanism for rotating the shaft 64.

In carrying out the invention any preferred form and construction of parts may be employed so long as they possess the necessary characteristics, but I have shown one form in the drawings which is highly effective in operation, and the several parts of the machine will be taken up and described.

Frame.

In the embodiment shown, 1 represents a suitable standard or support which is of any preferred construction but it must have main bearings 2 at the top for the revolving feed head mechanism, a bearing 3 for the main driving shaft, a bearing 4 for a stub shaft, bearings 5 for a main counter shaft, brackets 6 for the ironing member, and an upper guide 7 for the collar removing mechanism. The frame is still further provided witih a boss 8 near the bottom for the treadle operating mechanism. The frame is still further provided near the right end bearing 2, as shown in Fig. 5, with a guiding flange 9 used for supporting the forming member.

Forming mechanism.

Loosely mounted upon the guiding flange 9 is a cylindrical forming member 10 provided with a forming flange 11 which is annular and is slotted at 12, as shown in Fig. 5 and Fig. 7, to form an opening through which the tab and band of the collar may be inserted to the clamping mechanism hereinafter described. This flange tapers out to a comparatively thin edge and is in cross section of substantially the proper configuration for the space to be provided between the flap or top and the body portion or band of the collar, this flange extending up between these two portions of the collar during the molding and ironing operation. The cylindrical forming member 10 is guided and held against rotation by a rod 13 guided in a member 7 of the frame and secured to the forming member by screws 14 passing through the same and projecting inward from the inner wall thereof. The projecting ends of these screws pass into a longitudinally disposed recess 15 in a block 16 secured to the flange 9, as shown in Fig. 5, and serve as a means for preventing the rotation of the forming member 10 about the flange. Pivotally secured to the rod 13 is an operating lever 17 fulcrumed upon a bracket 18 secured to the frame. This forming member 10 normally assumes a position to the left, as shown in Figs. 1, 5, 6, 11 and 12, and remains in this position during the forming of the collar, but after the collar is formed and is ready for removal this forming member 10 is shifted to the right from the position shown in Fig. 5 to the dotted line position shown in Fig. 7 and the collar is pushed from the forming head and discharged from the machine.

Feeding mechanism.

The mechanism for feeding the collar upon the former comprises a feeding head member 19 preferably of hollow construction and having a hollow shaft portion 20 which is mounted in the bearings 2. This shaft portion has a recess or longitudinally disposed pocket 21 for a purpose to be described, and is provided on its outer end beyond the left bearing 2, shown in Fig. 5, with a driving gear 22. The shaft is projected beyond this driving gear and is threaded for a purpose which will later appear. The pocket 21 is continued in the feeding head member 19 and forms a pocket 23 in that member. Mounted in this recess formed by the pockets 21 and 23 is a clamping member or lever 24 pivoted upon a pin 25 secured in the feeding head member and it is provided with a tail portion 26 which extends along the pocket portion 21 in the shaft and is forced up by a spring 27 mounted in a suitable recess in the tail portion and engaging the bottom of the pocket portion 21. The clamping member 24 is still further provided with a clamping arm 28 which is adapted for engagement with a clamping member 29 secured to the periphery of the feeding head member 19 and overhanging the pocket 23. The outer face of the feeding head member is slightly inside of the edge of the flange and the clamping members 28 and 29 extend from the outer face of the feeding head member inward so that there is a sufficient hold for the tab of the collar which is held tightly between these clamping members, so that when the feeding head is revolved the collar is carried with it. The clamping member 28 is moved into engagement with the clamping member 29 by a cylindrical sleeve member 30 loosely mounted upon the hollow shaft 20 and adapted when moved to the right to engage the tail portion 26 and force it down, thereby moving the clamping member 28 into engagement with the clamping member 29 or into engagement with the tab of the collar if it be inserted between them. This sleeve 30 is shifted by a lever 31 pivoted upon a pin 32 mounted in the frame, the lever 31 being provided with a forked end 33 engaging in a groove 34 in the sleeve 30. The lower end of this lever, as shown in Fig. 3, is provided with a pin 35 engaging in a slot 36 in a rod 37. A spring 38 is connected to the lower end of the lever or to the pin 35 and in an opening 39 in the right-hand end of the rod so that the pin 35 normally assumes a position to the right end of the slot. This rod 37 is shifted by the pressing head mechanism to be later described. When the rod 37 is moved to the right to the position shown in Fig. 3, the spring 38 shifts the lever 31 in a counter clockwise direction moving the sleeve 30 into engagement with the tail portion 26 and bringing about the clamping action referred to.

The feeding head 19 is hollow as before stated, and is provided with a head plate 19' engaging in a threaded opening in the face of the head and serving as a means for obtaining access to the interior. This head is shown clearly in Figs. 6, 9 and 13. This interior chamber is heated by suitable steam connections 40 which pass through a suitable stuffing box construction 41 mounted upon the threaded projected end of the shaft 20. These steam connections form no part of the invention, and therefore need no detail description, it being important merely to state that the head is heated to a proper degree for drying out the collar on the inside.

Folding line guide.

In order to properly mold a collar, it is important that the folding should be started at the proper point which is at the "seam" so called, and suitable mechanism is provided for this purpose, this mechanism being arranged in separate figures for clearness and for the purpose of preventing the obstruction of other parts. This guiding mechanism is shown in Figs. 7, 8, 9, 10 and 11, and consists of a strip 42 of thin metal mounted in a slot 43 in the forming member and extending out to a point which is flush with the edge of the flange of the forming member as shown in Figs. 7 and 11 and to the left side of the recess or slot 12, as shown in Figs. 7, 8 and 9. At its outer end the strip 42 may be provided with an extension 44 which merely increases the length of the outer edge over which the collar is folded. The opposite end of the strip 42 is provided with an arm 45 shown in Figs. 7, 8, 10 and 11 which extends down through a slot 46 shown in Figs. 7 and 10 in the forming member and carries at its lower end a rod 47 adapted to engage an annular cam 48 arranged on the rear face of the feeding head and engaging in a slot 49 in the forming head as shown in Fig. 11. This cam has a low spot 48' at a point such that when the clamping members 28 and 29 are at the slot 12 in the flange 11 the end of the guiding member is flush with the outer edge of the flange 11, but as soon as the clamping members pass beyond the slot the cam 48 permits the guiding strip 42 to move to the left and out of the way so that the collar is free to feed onto the edge of the flange 11. This guiding strip 42 is normally moved to the right, as shown in Figs. 1, 7 and 11, by a spring 50 mounted upon a rod 51 which passes loosely through a stud 52 secured in the frame. This spring bears between the stud and the arm 45.

*Collar removing latches.*

Referring to the removal of the collar from the flange 11 by the shifting of the lever 17 and to the return of the forming member to its normal position, suitable means are provided for preventing the collar from moving back with the former, and they comprise gravity latches 53 mounted upon the face of the feeding head 19, as shown in Fig. 9, and adapted to drop in behind the edge of the band or body portion of the collar so that when the forming member is returned to normal position, the collar remains stationary, as it were, and is fed off of the flange 11 and is free to drop from the machine.

*Pressing and ironing mechanism.*

The pressing and ironing mechanism for the edge of the collar will now be described. A shifting lever 54 is pivotally mounted in the lower bracket 6, as shown in Figs. 1, 2 and 3, and it extends up to a point opposite the feeding head where it is provided with a circular steam chest 55 which is supplied with steam passing through suitable connections, not shown but secured in openings 56 in bosses 57, shown in Fig. 2. This head is provided upon its inner face, or the face toward the feeding head, with an ironing plate 58 having an ironing groove 59 adapted to engage over the folded edge of the collar as it is arranged upon the flange 11. A guiding deflector plate 60 is secured to the edge of the ironing plate 58 for turning the top or flap down upon the outer face of the flange 11. This plate is properly curved to bring about the desired result. The ironing plate 58 is also provided with a deflector plate 61 which moves with the ironing plate and steam chest 55 and is adapted to deflect the collar away from the mechanism and out into a suitable receptacle, such as a basket, (not shown). A bolt 62 or other suitable means secured in a boss 63 secured to this lever 54 serves as a pivotal connection between the lever and the bar 37 which operates the sleeve controlling the clamping member 28. From the foregoing it will be seen that when the lever 54 is swung away from the forming head access may be had to the parts and a collar may be fed in, but when it is drawn toward the ironing head it is in a position to guide the collar onto the former and to finally press and iron the folded edge of the collar. Since the mechanism for operating this lever forms a very important part of the driving mechanism it will be taken up in connection with the driving and operating mechanism.

*Driving and operating mechanism.*

Rotatably mounted in the bearings 5 is a main counter shaft 64 which extends through the entire machine and is provided inside of the left bearing 5 with a gear wheel 65. This gear wheel 65 is loose upon the shaft 64 and meshes with a pinion 66 integral with a gear 67 meshing with a driving pinion 68 upon the main driving shaft 69 driven by a pulley 70. This gear 65 is provided upon one of its side faces, preferably the left, as shown in Figs. 5 and 6, with clutch teeth 71 adapted to mesh with clutch teeth 72 carried by a driving sleeve 73 loosely mounted upon the shaft within the bearing 5. This sleeve has integral with it a driving gear 74 which in turn meshes with the gear 22. The sleeve 73 with the gear 74 are adapted to slide endwise upon the shaft 64 so that the clutch teeth may come into and out of engagement, but it is normally held in a position to the right, with the clutch teeth in engagement, by a spring 75 held upon the end of the shaft by a suitable cotter pin 76 or other similar device. A suitable shifting cam member 77 is provided upon a shaft 78 and back of the gear wheel 74 for shifting the gear wheel to the left for manually disengaging the clutch teeth at any stage in the operation of the machine, but suitable means are provided for causing the gear wheel to become disengaged automatically upon one complete revolution of the shaft 64. This mechanism comprises a cam surface 79 carried by the inner face of the gear wheel 74 and engaging a bevel pin 80 secured in the frame. In this way when the gear wheel has made a complete revolution, the cam face 79 engages the beveled end of the pin 80, shifts the gear and its sleeve 75 to the left bringing about the disengagement of the clutch teeth and stopping the rotation of the feeding head. The gear then remains in this position with the cam face 79 in engagement with the bevel pin 80 until the shaft 64 is revolved sufficiently to disengage the cam 79 and pin 80, and this is brought about by means of the following mechanism:—

Keyed to the shaft 64 and to the right of the frame, as shown in Fig. 5 and elsewhere, is a cam hub 81 having a crown cam 82, shown in Figs. 1, 2, 3, 5 and 6. The edge of this cam engages a friction roller 83 mounted upon a pin 84 carried by an arm 85 forming a part of the lever 54. This cam has a low portion 82' which permits the lever 54 to hold the ironing head in its outermost position, while the edge 82 of the cam serves to draw the ironing head up toward the feeding head, and an additional high portion 82″ on the edge of the cam serves to cause the lever 54 to force the ironing head with increased pressure toward the collar and feeding head, the arrangement of the driving mechanism for permitting such operation being described later. In normal position when the parts are in a state of rest, the gear wheel 74 is shifted to the left with the clutch teeth 71 and 72 out of engagement, the friction roller 83 resting in the low portion of the cam, and the machine is open and ready for operation, but as the shaft 64 is revolved this cam causes the roller to travel up over the edge of it and the lever 54 is moved inward as described, but in order to start the parts, a partial rotation must be conveyed to the shaft 64 and this is accomplished by a ratchet rotating device, shown in Fig. 14, and it comprises a crank arm member 86 loosely mounted upon the shaft 64 about ratchet teeth 87 formed on the hub 81. A suitable pawl 88 provided with a spring 89 serves to connect the crank arm 86 with the ratchet wheel, and when the crank arm is rocked with respect to the shaft 64, the latter is rotated sufficiently to cause the cam face 79 to pass out of engagement with the bevel pin 80, thus releasing the gear wheel 74 on the shaft 64 bringing about the coupling of the clutch teeth 71 and 72 and causing rotation of the feeding head. In the meantime, however, the cam 82 has shifted the lever 54 so that the ironing head, including the steam chest and the ironing plate, has been moved up toward the feeding head and the parts continue to rotate in this manner until one cycle of the feeding head has been accomplished when the clutch teeth 71 are disengaged as previously described and the parts are back to the position, when the roller 83 is resting upon the high part 82″ of the cam where it will remain until the cam 82 is rotated sufficiently to bring the roller 83 opposite to the low part of the cam, this operation being accomplished by a movement of the foot treadle through the ratchet mechanism already described. The cam face 79 is so arranged that the high part of the cam will pass under the roller 83 before the cam face engages the pin 80 and will remain upon this high portion until this engagement is brought about and the clutch teeth 71 and 72 are out of engagement. In order to convey a rotary movement to the crank arm 86, a treadle bar 90 is provided and it is pivoted to a suitable pin 91 mounted in the boss 8 forming part of the frame. This treadle lever is connected to the crank arm 86 by a suitable link 92. In order that the ironing head may be pressed up with a yielding force or pressure against the collar, the hub 81 carrying the cam wheel 82 is slidably mounted upon the shaft 64 and between the end of this hub and a stop collar 93 is a coiled spring 94 which forces the hub 81 with the cam wheel to the left as shown in Fig. 5 so that when the cam moves the lever inward, the spring is compressed and the lever 54 is yieldingly forced toward the collar. The stop collar 93 is held in place by suitable nuts 95 mounted upon the projected end of the shaft 64. The projected end of the shaft 64 passes through an opening 54′ in the lever 54 and the collar 93 serves as a stop for the lever in its outward movement.

It is preferable to arrange the gearing and the driving mechanism in a manner such that the gear 74 may continue to rotate without rotating the gear 22 or without feeding the collar farther during the bringing about of the increased pressure of the ironing member upon the collar, this operation being brought about by the high portion 82″ of the cam, and this is accomplished by providing a blank portion 74′ upon the gear 74 and a corresponding blank portion 22′ upon the gear 22. These blank portions bring about the stopping of the rotation of the feeding head, while the rotation of the counter shaft 64 continues to bring about the increased pressure referred to. These blank portions are clearly shown in Fig. 1 and Fig. 4.

Suitable feeding mechanism is arranged for the top or flap of the collar so that it is fed at substantially the same rate of speed as the band or body portion during the feeding operation. This mechanism is only shown in Figs. 12 and 13 since it would complicate the other figures to show it in them and it comprises a pair of shafts 96 and 97 mounted in suitable brackets 98 secured to the frame, and these shafts are driven by a gear wheel 99 having its pitch line of substantially the diameter of the former flange and meshing with gears 100 and 101 mounted upon the shafts 96 and 97 respectively. Each of these shafts has keyed to it a hub 102 provided with a flange 103 engaging in an annular recess 104 in the forming member and further provided with a rubber or other friction roller 105 which is adapted to bear lightly against the surface of the former flange. The gearing is such that the peripheries of these rollers rotate at approximately the speed of the periphery of the former flange, so that the top or flap of the collar is fed at the same rate of speed that the band or body portion of the collar is fed. The object of the foregoing construction is to obviate the wrinkling or drawing of the skin of the collar at the folded edge, this defect in the operation being caused by the fact that the top or flap of the collar has frictional engagement with the guiding plate 60 which would tend to hold that part of the collar back and create a drawing action with respect to the band or body portion.

Complete operation.

Assuming that the parts of the machine are in the position shown in Figs. 1 and 5 and that a collar is to be fed to the machine, the operator first places the tab containing the button hole through the slot 12 and between the clamping members 28 and 29 and then folds the collar at the seam, which has been previously moistened, back upon itself or he need only fold the flap upward sufficiently so that the guide 60 may catch it. The treadle 90 is then pressed when the shaft 64 will be rocked causing the cam 82 to shift the lever 54 and pressing the ironing head inward causing the guide 60 to engage the collar and fold it down toward the flange 11. In the meantime, the cam face 79 has moved out of engagement with the bevel pin 80 and the spring 75 has caused the gear wheel 74 to move to the right, as shown in Fig. 5, when the clutch teeth 71 and 72 will be in engagement. The drive through the gear 65 is then conveyed through the gear 22 to the shaft 20 and the feeding head is rotated. In the meantime however the movement of the lever 54 has shifted the clamping lever 31 and the sleeve 30 has engaged the tail 26 of the clamping lever, forcing the clamping member 28 into engagement with the underside of the tab of the collar. The collar is then carried around and the folded-over portion is fed onto the edge of the flange 11 at the slot 12, and the collar is carried around in circular formation around this flange. This operation continues until a complete rotation has been conveyed to the feeding head. When the cam 82 has rotated sufficiently to cause its high spot 82'' to pass under the roller 83 the cam face 79 of the gear 74 will engage the bevel pin 80 and cause the gear to be shifted to the left, as set forth in Fig. 6, disengaging the clutch teeth 71 and 72 when further rotation of the mechanism will cease. The parts then remain in this position until they are released, and this release is brought about by an operation of the foot treadle through the ratchet and pawl mechanism upon the hub of the cam, producing a slight rotation of this member until the friction roller 83 passes to the low part 82' of the cam when the lever 54 will move outward. The operator then shifts the lever 17 moving the forming member 10 to the right, as shown in Fig. 5, and carrying the collar out beyond the feeding head. When the back edge of the inner or body portion of the collar passes beyond the gravity latches 53, they snap behind the edge of the body portion, and upon the return of the forming member 10 the collar is slid from the flange 11 and drops down and engages the deflector and is thrown from the machine into a basket or other suitable receptacle (not shown).

Having described my invention, I claim:—

1. In a molding machine for turned down collars, a forming member for the complete collar, means for automatically folding and forming the collar upon said former, and means for simultaneously pressing the entire folded edge of the collar upon said former.

2. In a molding machine for turned-down collars, a cylindrical forming member, mechanism for automatically folding and forming the collar upon said former, and means for simultaneously pressing and ironing said collar upon said former.

3. In a forming and ironing machine for turned down collars, a suitable former, means for gripping the collar and fitting it upon the former, means for folding the top portion of the collar against the former, and means for simultaneously pressing and ironing the entire folded edge against the former.

4. In a molding and ironing machine for turned-down collars, a former adapted for engagement between the top and the body portion of the collar, a feeding head mounted within said former and adapted to feed the collar onto said former, and means for turning the flap and finally pressing and ironing the entire folded edge of the collar.

5. In a forming and ironing machine for turned down collars, a cylindrical former, means for gripping the collar and fitting it upon the former, means for folding the top portion of the collar against the former, and means for simultaneously pressing and ironing the entire folded edge against the former.

6. In a molding and ironing machine for turned-down collars a former for engagement between the flap and the body portion of the collar, means for feeding the collar onto said former, and a movable ironing member adapted by its initial movement to turn the flap of the collar down upon the former and to guide the flap continuously upon the former and to simultaneously iron and press the entire folded edge of the collar.

7. In a molding and ironing machine for turned-down collars, a former adapted for engagement between the top and the band portion of the collar, means for automatically feeding the collar onto said former, turning the top of the collar down upon the former, and simultaneously ironing and pressing the entire folded edge of the collar.

8. In a molding and ironing machine for turned-down collars, a former for engagement between the flap and the body portion of the collar, means for feeding the collar upon said former, an ironing member adapted to move toward said former upon the initial movement of the feeding device and to fold the flap of the collar down onto the former, said ironing member being provided with an ironing plate adapted for engagement with the entire folded edge of the collar, and means for causing said ironing plate to bear simultaneously upon the entire turned edge of the collar.

9. In a molding and ironing machine for turned-down collars, a former for engagement between the flap and the body portion of the collar, means for feeding the collar onto said former, a heated ironing head movably mounted, an ironing plate carried by said ironing head and provided with an ironing groove co-extensive with and receiving the entire folded edge of the collar, and means for moving said head.

10. In a molding and ironing machine for turned-down collars, a former for engagement between the flap and the body portion of the collar, means for feeding the collar onto said former, a lever suitably mounted, an ironing head mounted on said lever, an ironing plate carried by said head and provided with a groove co-extensive with and receiving the entire folded edge of the collar and pressing it against the edge of the former, means for shifting said lever, and means for supplying heat to the several parts.

11. In a molding and ironing machine for turned-down collars, a former, a feeding head, means carried by said feeding head for holding the collar, means for operating said head and causing it to feed the collar onto the former, and means for turning the top of the collar onto the former and for ironing the turned edge thereof.

12. In a molding and ironing machine for turned-down collars, a former, a rotary feeding head adapted to feed the collar onto said former, clamping members carried by said feeding head and adapted to engage and hold the tab of the collar, whereby the feeding head may feed said collar upon the former, and means for folding the flap of the collar upon the former and for pressing and ironing the turned edge of the collar.

13. In a molding and ironing machine for turned-down collars, a cylindrical former, means for feeding the collar onto said former, means for simultaneously folding the top down upon the former and for pressing and ironing the collar, and automatical operating means for discharging the finished collar from the former.

14. In a molding and ironing machine for turned-down collars, a suitable former, means within said former for gripping the collar and for feeding it upon the former, means for simultaneously folding the flap against the former and for pressing and ironing the collar, means for shifting the former endwise to remove the collar from the feeding head, and devices for engaging the collar to hold the same upon the withdrawal of the former therefrom and thereby discharging the collar from the machine.

15. In a molding and ironing machine for turned-down collars, a cylindrical former slidably mounted but held against rotary movement, a rotatable feeding head within said former and held against endwise movement, said feeding head being adapted to feed the collar onto said former, means for folding the flap and ironing the collar, means for shifting said former with respect to the head whereby the collar may be carried beyond the feeding mechanism, and means engaging the collar and permitting the withdrawal of the former from the collar.

16. In a molding and ironing machine for turned-down collars, a cylindrical former slidably mounted but held against rotary movement, a rotatable feeding head within said former and held against endwise movement, said feeding head being adapted to feed the collar onto said former, means for folding the flap and ironing the collar, means for shifting said former with respect to the head whereby the collar may be carried beyond the feeding mechanism, and suitable latches engaging the collar and permitting the withdrawal of the former from the collar.

17. In a molding and ironing machine for turned-down collars, a cylindrical former slidably mounted but held against rotary movement, a rotary feeding head within said former, collar clamping mechanism carried by said head, an ironing member movably mounted, an ironing plate carried thereby for pressing and ironing the turned edge of the collar, means for moving said ironing head, a folding plate for folding the flap of the collar onto the forming member, and means for supplying heat to the several parts.

18. In a molding and ironing machine for turned-down collars, a cylindrical former slidably mounted but held against rotary movement, a rotary feeding head within said former, collar clamping mechanism carried by said head, an ironing member movably mounted, an ironing plate carried thereby for pressing and ironing the turned edge of the collar, means for moving said ironing head, a folding plate for folding the flap of the collar onto the forming member, means for moving the former endwise beyond the feeding head, and devices for engaging the collar and permitting the withdrawal of the former.

19. In a molding and ironing machine for turned-down collars, a cylindrical former slidably mounted but held against rotary movement, a rotary feeding head within said former, collar clamping mechanism carried by said head, an ironing member movably mounted, an ironing plate carried thereby for pressing and ironing the turned edge of the collar, means for moving said ironing head, a folding plate for folding the flap of the collar onto the forming member, means for moving the former endwise beyond the feeding head, and latches carried by the feeding head for engaging the collar and permitting the withdrawal of the former.

20. In a molding and ironing machine for turned-down collars, a cylindrical former for engagement between the flap and the body portion of the collar, such former being provided with an entrance slot, means for feeding the collar upon said former through said slot, and suitable ironing and pressing mechanism coöperating with said former.

21. In a molding and ironing machine for turned-down collars, a cylindrical former for engagement between the flap and the body portion of the collar, such former being provided with an entrance slot, means for feeding the collar upon said former through said slot, a folding guide arranged above said former for indicating the folding line of the collar, and suitable pressing and ironing mechanism coöperating with said former.

22. In a molding and ironing machine for turned-down collars, a former for engagement between the flap and the body portion of the collar, such former being provided with an entrance slot, means for feeding the collar upon said former through said slot, a folding guide arranged above said former and adjacent said slot and adapted to assist in the forming and feeding of the collar, means for automatically withdrawing said guide upon the beginning of the feeding operation, and suitable pressing and ironing mechanism.

23. In a molding and ironing machine for turned-down collars, a former for engagement betwen the flap and the body portion of the collar, said former being provided with a feeding slot, feeding mechanism within said former, a collar clamping device carried by said feeding mechanism, a movable ironing member adapted to iron and press the collar upon the former, a guide by which the fold in the collar is located prior to the feeding operation, a driving member for the machine, and suitable mechanism for causing the movement of the ironing member toward the former and simultaneously bringing about the clamping and feeding of the collar and the withdrawal of the guide.

24. In a molding and ironing machine for turned-down collars, a former, a feeding device rotatably mounted therein, a collar guide carried by said former, suitable gearing for automatically withdrawing the guide upon the beginning of the feeding operation, and suitable pressing and ironing mechanism.

25. In a molding and ironing machine for turned-down collars, a former for engagement between the flap and the body portion of the collar, mechanism for feeding the collar onto said former, suitable means for simultaneously pressing and ironing the entire folded edge of the collar upon said former, and suitable power driven devices for engaging and feeding the flap with the feeding of the body portion of the collar.

26. In a molding and ironin machine for turned-down collars, a former for engagement between the flap and the body portion of the collar, mechanism for feeding the collar onto said former, suitable means for simultaneously pressing and ironing the entire folded edge of the collar upon said former, power driven feeding rollers for engaging the flap causing it to be fed upon the former with the body portion, and means for causing the peripheries of said rollers, to move at the same speed as the body portion of the collar is fed.

In testimony whereof I affix my signature in presence of two witnesses as follows.

DANA H. BENJAMIN.

Witnesses:
ALTON H. BEMIS,
CHRISTINE H. TRESCH.